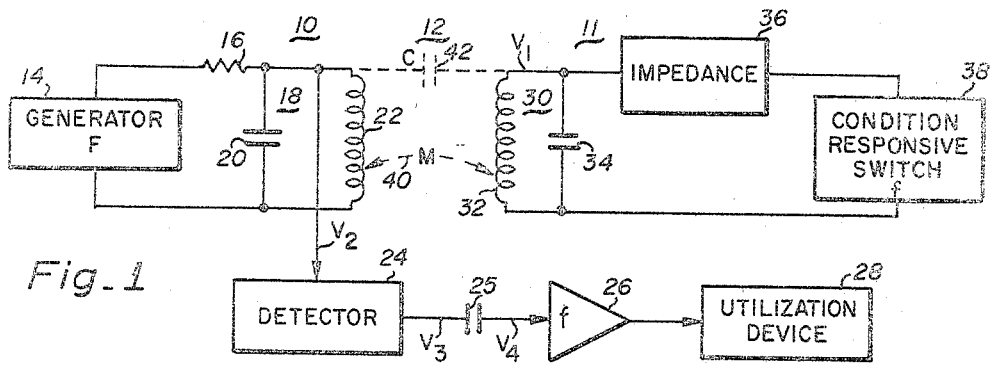
Fig_1
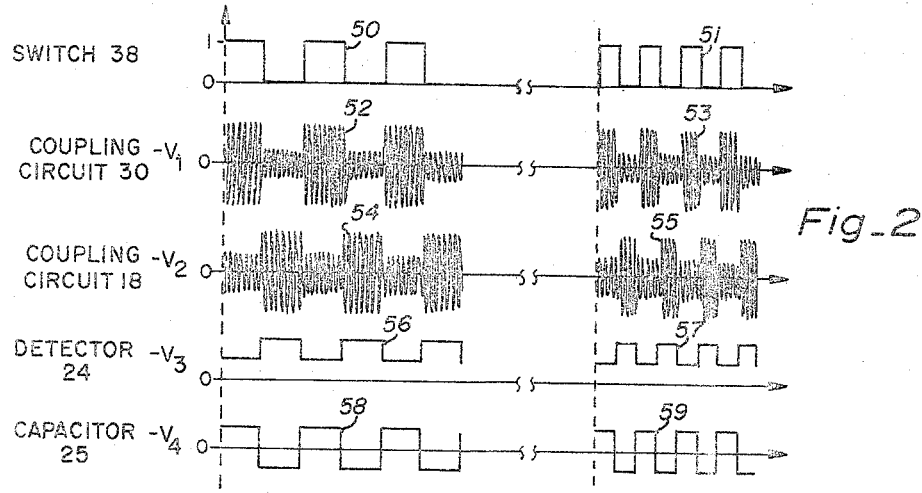
Fig_2
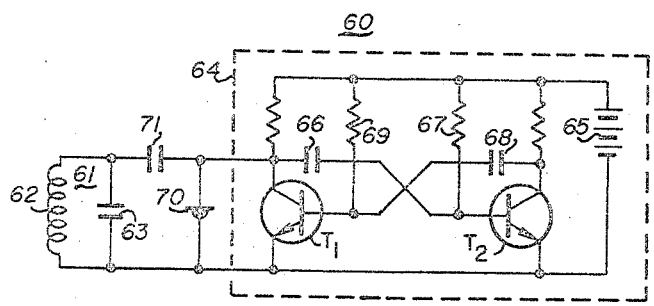
Fig_3

3,427,614
WIRELESS AND RADIOLESS (NONRADIANT) TELEMETRY SYSTEM FOR MONITORING CONDITIONS
Jorgen P. Vinding, 18780 Withey Road, Monte Sereno, Calif.
Continuation-in-part of application Ser. No. 497,181, Oct. 18, 1965, which is a continuation-in-part of application Ser. No. 453,939, May 7, 1965. This application Apr. 26, 1967, Ser. No. 633,798
U.S. Cl. 343—6.5
Int. Cl. G01s 9/56
14 Claims

ABSTRACT OF THE DISCLOSURE

A telemetry system which includes a transmitter having a transducer for converting the condition being monitored into an alternating current condition signal whose frequency is a measure of the condition monitored, and a tuned coupling circuit which is detuned or loaded at the frequency of the condition signal. The telemetry system further includes a receiver having an excited tuned coupling circuit which is inductively or capacitively, or partially inductive and capacitively, coupled to the transmitter coupling circuit and therefore reacts to the detuning or loading of the transmitter coupling circuit. This reaction is a modulation at the frequency of the condition signal and is detected by the receiver to provide a measure of the condition being monitored.

---

This application is a continuation-in-part of Ser. No. 497,181 filed on Oct. 18, 1965 which in turn is a continuation-in-part of Ser. No. 453,939 filed May 7, 1965, now Letters Patent 3,299,424.

BACKGROUND OF THE INVENTION

Field of the invention

This invention relates to a telemetry system for monitoring a condition and, more particularly, to a telemetry system in which a measure of the monitored condition is transmitted from a telemetry transmitter to a telemetry receiver through a mutual inductive or a capacitive coupling, or a combination thereof, thereby eliminating the necessity for a wire or a radio communication link.

Description of the prior art

It is often desirable to monitor conditions such as, for example, temperature, pressure, humidity, strain and the like, where it is impractical, or even impossible, to effect a direct wire connection between the condition transducer and the receiver. Such situations usually occur where the condition to be monitored is remote or in an inaccessible location. In such instances, prior art systems have usually relied on a radio transmission telemetry system in which the output signal of the condition sensor is used in some manner to modulate a radio wave of a radio transmitter which is transmitted to a distant radio receiver for further processing.

The disadvantages of a radio communication link are many and include, among other factors, the necessity of having to provide a radio transmitter at the remote or inaccessible location which is usually bulky in size, heavy in weight and difficult to maintain and service. Further, a power supply is usually required to power the transmitter which is often inconvenient and sometimes impossible to service. Additionally, the generation of the high frequency radio waves may interfere with other equipment or devices, or may even be prohibited under present FCC regulations. Aside from these enumerated disadvantages, there are applications where a radio communication link cannot be provided because of the inability to construct a transmitter-transducer of sufficiently small size to monitor the condition.

One communication link which overcomes the above-mentioned disadvantages is the mutual inductive coupling described in my above-identified Letters Patent 3,299,424 which issued on Jan. 17, 1967 for "Interrogator-Responder Identification System." Another communication link which overcomes the above-mentioned disadvantages is the capacitive coupling described in my above-identified copending application Ser. No. 497,181 filed on Oct. 18, 1965 for "Interrogator-Responder Identification System." Both these communication links are wireless and radioless (a term used herein to designate the absence of a high frequency transmission link), and instead utilize the interaction of a pair of inductively or capacitively coupled tuned circuits in which one circuit is detuned or loaded at a rate which is equal to the condition signal frequency, and thereby reflects this change of condition into the other circuit where the condition frequency is detected. The frequency of the condition signal is the intelligence communication from the transmitter to the receiver.

The communication link principle disclosed in the above-identified references will, at times, be referred to herein as "modulated reaction" because any change of condition of the secondary circuit, such as may be had by detuning or by changing its lossiness or a combination thereof, is reflected in the primary tuned circuit which reacts thereto in a manner well-known to those skilled in the coupled circuit art. Further, when the change of condition is associated with some intelligence, the change of condition may be termed a modulation to which the primary circuit will react.

Utilization of the principle of modulated reaction is employed in the above-identified references in connection with an interrogator-responder identification system wherein the responder coupling circuit is modulated in a unique constant manner to identify itself, either as a member of a selected class of objects or as a selected object within a class, and the interrogator coupling circuit picks up this modulation by modulated reaction for processing.

It is therefore a primary object to provide a telemetry system utilizing a modulated reaction communication link between a receiver and transmitter in which the transmitter includes a condition responsive element for monitoring a selected condition.

It is another object of this invention to provide a telemetry system which requires neither a wire communication link nor a radio communication link between the telemetry transmitter and the telemetry receiver.

It is a further object of this invention to provide a telemetry system in which the communication link between the transducer and the receiver is formed by two interacting coupling circuits which transmit the intelligence by reaction.

It is still a further object of this invention to provide a means for monitoring the condition of a function utilizing a passive transmitter and an active receiver which are interconnected either inductively or capacitively, or a combination thereof.

It is a still further object of the present invention to provide a telemetry system having a wireless and radioless communication link between its receiver and transmitter and in which the transmitter is powered by the receiver.

SUMMARY OF THE INVENTION

In accordance with a preferred embodiment of the telemetry system of this invention, a telemetry transmitter is provided which includes a coupling circuit tuned to a selected freqeuency F. This transmitter coupling circuit is connected, through a condition responsive switch means which forms the transducer, to an impedance means which detunes or loads (or partially detunes and loads) the coupling circuit to thereby change a characteristic of the coupling circuit. The condition responsive switch means includes an element which is responsive to the condition to be monitored and which is operative to change the switching rate $f$ of the switching means in accordance with the monitored condition.

There is further provided a telemetry receiver which includes a coupling circuit tuned to the selected frequency $F$ and generator means connected to the coupling circuit for exciting the tuned circuit at that frequency. Further, a detector circuit is coupled to the receiver coupling circuit to detect any changed condition at the frequency $f$. The receiver coupling circuit and the transmitter coupling circuit are disposed in coupling relationship to one another which coupling may be capacitive, or inductive, or a combination thereof.

As long as the generator excited receiver coupling circuit is intercoupled with the transmitter coupling circuit, and the impedance of the transmitter coupling circuit remains constant, the reaction of the transmitter coupling circuit on the receiver coupling circuit is constant. However, if the impedance of the transmitter coupling circuit is changed between a first and a second state at some switching rate, this change of impedance will be reflected into the receiver coupling circuit at the switching rate and change the amplitude of the oscillations excited therein. By making the switching rate a function of the condition monitored, the rate of variation of the amplitude of the oscillations in the receiver coupling circuit will become a function of the condition being monitored, and thereby provide a modulated signal whose frequency is a function of the monitored condition.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawings in which:

BRIEF DESCRIPTION OF THE DRAWINGS

FIGURE 1 is a schematic circuit diagram of a condition monitoring telemetry system in accordance with this invention utilizing a modulated reaction communication link;

FIGURE 2 are a number of voltage-time diagrams illustrating the voltages at various points in the telemetry system shown in FIGURE 1;

FIGURE 3 is a schematic circuit diagram of a specific embodiment of the telemetry transmitter shown in FIGURE 1;

DESCRIPTION OF THE PREFERRED EMBODIMENT

Figure 4:
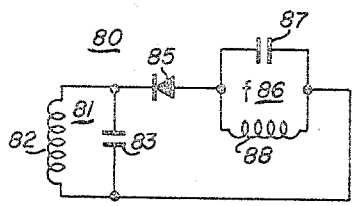
FIGURE 4 is a schematic circuit diagram of another embodiment of the telemetry transmitter of FIGURE 1 which requires no external power and which is useful for monitoring a single condition.

The telemetry system of this invention, as will become better understood hereinafter, comprises what will be referred to herein as a telemetry receiver including a utilization device, a telemetry transmitter including a transducer, and a communication link between the receiver and transmitter. Even though the terms "receiver" and "transmitter" generally infer a wire or radio communication link, they are believed to be best suited to describe the terminal portions of any telemetry communication link—regardless and independent of the particular communication link utilized.

Referring now to FIGURE 1 of the drawings, there is shown a telemetry receiver 10, a telemetry transmitter 11 and a communications link 12 for intercoupling receiver 10 with transmitter 11.

Telemetry receiver 10 includes a signal generator means 14 for generating a substantially sinusoidal receiver signal of a frequency F, a load impedance 16, and a coupling circuit 18 which is tuned to the receiver signal frequency F and which is connected across the serial combination of generator 14 and load impedance 16. Coupling circuit 18 comprises a capacitive impedance 20 and an inductive impedance 22 which have their respective impedances selected to tune coupling circuit 18 to the receiver signal frequency F.

Telemetry receiver 10 further comprises a transmitter signal sensing and utilization circuit which includes a detector means 24 having its input connected to coupling circuit 18, an amplifier 26 which is broadly tuned to the transmitter signal frequency $f$ and having its input coupled to the output of detector 24 through a suitable coupling capacitor 25, and a utilization device 28 which receives its input from amplifier 26. Utilization device 28 is generally a frequency determining device, such as a frequency discriminator, which is capable of determining the exact frequency $f$ of the transmitter (condition) signal.

Telemetry transmitter 11 comprises a coupling circuit 30 which is tuned to the receiver signal frequency F and which includes an inductive impedance 32 and a capacitive impedance 34 whose respective impedances are selected to properly tune the circuit. Telemetry transmitter 11 further comprises an impedance 36 which is connected across coupling circuit 30 by means of a condition responsive switch means 38. Impedance 36 may be resistive or reactive or partially resistive and reactive so that, if connected across coupling circuit 30, it either detunes or loads or detunes and loads coupling circuit 30. Condition responsive switch means 38 is a switch whose switching rate is made dependent on the condition being monitored and which switches impedance 36 in and out of coupling circuit 30 at the transmitter signal frequency $f$.

Communication link 12 may comprise the interaction of inductive impedances 22 and 32 resulting from close spacing in which case the link is a mutual inductance coupling as indicated at 40 by dotted arrows and the letter M. Communication link 12 may also comprise a capacitive coupling in which each coupling circuit is connected to one plate of a capacitor shown in dotted outline at 42 and indicated by the letter C. Of course, the link may also comprise a combination of M and C as will be readily understood to those skilled in the art. A suitable mutual inductive coupling link is described in the above-mentioned Letters Patent No. 3,299,424, and a suitable capacitive coupling link is described in the above-referenced copending application Ser. No. 497,181.

The operation of this invention will be best understood by preliminarily considering the effect of coupling circuit 30 on coupling circuit 18. As is well-known, when a pair of resonant circuits are brought into coupling proximity and one of the circuits is excited, the amplitude of the excited oscillations will decrease with increase of coupling because of the load reflected into the excited coupling circuit by the other coupling circuit. Because of the similarity to transformer theory, and because coupling circuit 18 is excited, the same may be referred to as the primary circuit and coupling circuit 30 may be referred to as the secondary circuit. The sharper the secondary circuit is tuned to the frequency excited in the primary circuit and the less lossy the secondary circuit, the greater is its effect on the primary circuit assuming a constant coupling therebetween. If the secondary circuit is made either lossy or is detuned, its effect on the primary circuit decreases resulting in an increase of the oscillation amplitude.

Tuned coupling circuit 18 is excited by generator 14 to cause oscillations at the receiver frequency F therein. In the preferred embodiment of this invention, the physical size of coupling circuit 18 is much less than one-quarter wavelength of the receiver frequency so that wave energy radiation is negligible. In any event, if there be any radiation, the same is only incidental and does not enter into the operation of the system.

Transmitter 11 and, more particularly, condition responsive switch 38 is positioned to monitor the desired condition. For example, transmitter 11 may be surgically implanted in the body of a person to monitor the person's arterial blood pressure, or may be placed inside a rotating shaft to monitor bearing temperature, or may be inserted into a cavity of the rim of a fly wheel to monitor strain and the like. Just like coupling circuit 18, coupling circuit 30 is dimensioned to be substantially nonradiative. When the coupling circuits of receiver 10 and transmitter 11 are brought within coupling proximity, coupling circuit 30 reflects an alternating load into coupling circuit 18, the load being a function of its reactive and resistive impedance. Impedance 36, which is switched in and out of coupling circuit 30 by switch means 38, therefore, either detunes or changes the lossiness of circuit 30, thereby varying the load it reflects into circuit 18.

As a consequence of switching impedance 36 into and out of the circuit at the transmitter (condition) frequency $f$, the condition of coupling circuit 30 is changed between a first state in which impedance 36 is not in the circuit and a second state in which impedance 36 is in the circuit. This change of condition of circuit 30 is sensed by circuit 18, the quantity being sensed being the switching rate of switch 38. The effect on circuit 18 is a change in the amplitude of the signal excited therein which varies at the switching rate $f$. This change is sensed by detector 24 and amplified by tuned amplifier 26 is within a selected frequency band. The output signal from amplifier 26 therefore is a measure of the switching rate. This switching rate is then analyzed by utilization device 28 which provides an indication of the switch frequency $f$. By making the switching rate $f$ a known function of the condition being monitored, the output of utilization device 28 provides a measure of the condition.

Referring now to FIGURE 2, there are shown a number of curves illustrating the operation of the invention. Graphs 50 and 51 are voltage versus time curves illustrating two different switching rates, the open condition of the switch being indicated by a "1" (true) and the closed condition being illustrated by a "0" (false).

Graphs 52 and 53 are voltage versus time curves showing, respectively, the amplitude of the voltages $V_1$ induced into coupling circuit 30 by coupling circuit 18 for the switch open and closed positions corresponding to curves 50 and 51. The induced voltage is a maximum when the switch is open which is characteristic of a low-loss tuned circuit, and a minimum when the switch is closed which is characteristic of a high-loss or detuned circuit.

Graphs 54 and 55 are voltage versus time curves of the voltage $V_2$ in coupling circuit 18 showing that the signal amplitude is a minimum when the switch is open and a maximum when the switch is closed. This is exactly the reverse of the voltage induced in coupling circuit 30.

Graphs 56 and 57 are the voltage versus time curves of the detected output voltage $V_3$ at the output terminal of detector 24 for the two switching rates. Finally, graphs 58 and 59 are the voltage versus time curves of the voltage $V_4$ applied to tuned amplifier 26 which are identical to curves 56 and 57, respectively, except that the DC component has been removed by coupling capacitor 25. The signals represented by curves 58 and 59 are of the same frequency as those of the switching rates illustrated by curves 50 and 51, and are analyzed by utilization means 28 which provides an output indicative of the switching rate.

While amplifier 26 is preferably tuned to the transmitter frequency $f$ (switching rate) for maximum selectivity and discrimination against noise, it is to be understood that its bandwidth must be sufficiently broad to allow the entire anticipated band of transmitter frequencies to pass therethrough. The bandwidth, therefore, must be commensurate with the largest deviation of the switching rate expected from some mid-value as the monitored condition varies from some minimum to some maximum value. The frequencies for $f$ and F may be selected from a wide range and are not critical. For example, frequency F may be selected from below 10 kilocycles to about 10 megacycles, the upper limit being determined in accordance with the allowable physical dimensions of either of the coupling circuits which should be sufficiently small to remain substantially nonradiative. Frequency $f$ or, more particularly, the mid-frequency is selected to be much less than frequency F, and is typically chosen from the range extending from about 2 to 50 kHz.

Referring now to FIGURE 3, there is shown an embodiment of a telemetry transmitter in accordance with this invention which provides square wave modulation of the detected signal, similar to curve 50 illustrated in FIGURE 2. Telemetry transmitter 60 comprises a coupling circuit 61 which includes an inductor 62 and a capacitor 63, a switched impedance means in the form of a varactor diode 70 connected across tuned circuit 61, and a switch control means in the form of a free running multi-vibrator 64 which includes a power supply 65. There is further provided a blocking capacitor 71 which allows a close connection at the receiver signal frequency F between coupling circuit 61 and varactor 70 while blocking the switching control voltage from multivibrator 64 from being shorted out by inductor 62.

Multivibrator 64 has an output frequency and a duty ratio which are determined by timing resistors 67 and 69 and by timing capacitors 66 and 68 connecting transistors $T_1$ and $T_2$, at least one of which is selected to be responsive to the condition being monitored. In the event that the condition being monitored is temperature, one of the resistances may be selected in the form of a thermistor, which, as is well-known, changes its impedance with temperature.

In operation, multivibrator 64 applies a voltage to varactor 70 which varies between a high (true) value and a low (false) value at the multivibrator output frequency $f$ and which, accordingly, switches the impedance of varactor 70 between that of a large and a small capacitance. Multivibrator 64 is constructed and connected in such a way that the impedance it represents to varactor 70, and through blocking capacitor 71 to coupling circuit 62, is always high. Further, the impedances of inductor 62 and capacitor 63 are selected so that coupling circuit 61 is tuned to the receiver signal frequency F preferably when transistor $T_2$ is conducting, taking into account the capacitance of varactor 70, so that the impedance presented to varactor 70 is a maximum.

Instead of varactor 70, a Zener diode may be utilized as the active switch element. In that case, the low multivibrator output voltage is selected below the breakdown potential of the Zener diode so that the same performs as a high impedance, and the high multivibrator output is selected sufficiently above the Zener diode breakdown voltage so that the impedance of the diode is low. A similar operation is obtained by dispensing entirely with element 70 and, instead, connect capacitor 71 directly to the collector electrode of transistor $T_1$ to provide a high impedance circuit when transistor $T_2$ is conducting and a low impedance circuit when transistor $T_1$ is conducting.

Referring now to FIGURE 4, the telemetry transmitter 80 there shown comprises a coupling circuit 81 which includes an inductor 82 and a capacitor 83 across which is connected a negative resistance diode 85 in series with a circuit 86 which includes a capacitor 87 and an inductor 88, at least one of which is condition responsive. Coupling circuit 81 is tuned to the receiver signal frequency F, and circuit 86 is tuned to frequency $f$ and includes at least one condition responsive impedance to change the frequency $f$ to provide a measure of the monitored condition.

As will now be shown, negative resistance diode 85, in combination with circuit 86, performs the function of an impedance switch whereby the impedance of circuit 86 is alternately connected and disconnected from circuit 81 with a frequency $f$. Power for operation is supplied by the RF signal coupled into circuit 81.

It is a well-known fact that a tuned circuit, loaded with a negative resistance device, will oscillate when properly selected component values are chosen; see, for example, E. W. Herold, "Negative Resistance and Devices for Obtaining It," Proc. IRE, vol. 23, p. 1201, Oct. 1935. Two types of negative resistance devices may be utilized, namely, the N-type or voltage controlled device where current is a single valued function of voltage, and S-type or current controlled device where voltage is a single valued function of current. Herold discloses that an N-type device will oscillate with a shunt resonant circuit and an S-type device will oscillate with a series resonant circuit.

When such a non-linear negative resistance device is combined with a tuned circuit to form an oscillator without special precautions to limit the oscillation amplitude, the negative resistance device will tend to switch between bias conditions above and below the region of negative resistance so that either the voltage (for S-type) or the current (for N-type) will be far from sinusoidal. The device can therefore truly be said to act as a switch under these conditions.

It is well-known that a non-linear capacitor, such as a varactor diode, presents a negative resistance when connected between circuits resonating at frequencies $f$ and $f_1$ and driven at frequency F, where $$f \ll f_1 < F \quad \text{and} \quad f + f_1 = F$$

and that both N-type and S-type negative resistance devices can be used for such switching operations. See, for example, Manley & Rowe, "Some General Properties of Non-Linear Elements," Proc. IRE, vol. 44, p. 904, July 1956; McDade, Proc. IRE, May 1961, p. 957 and January 1962, p. 91; Keizer, RCA Review, Dec. 1957, p. 475; and Bossard, Proc. IRE, July 1959, p. 1269.

Telemetry transmitter 80, utilizing a varactor as the negative resistance diode, operates on this principle in the following manner. Coupling circuit 81 corresponds to the tuned circuit $f_1$ and tuned circuit 86 corresponds to $f$ while the driving signal from the telemetry receiver corresponds to F. Since F and $f_1$ are much larger than $f$, tuned circuit 81 responds to them both at one time. When oscillating, varactor 85 acts as a switch which alternately connects and disconnects tuned circuit 86 across the coupling circuit 81 with a frequency equal to $f$ which is the transmitter signal.

While a varactor diode needs two tuned circuits and a high frequency pump input in order to show negative resistance, a tunnel diode is inherently a negative resistance of the N-type.

It is well-known that tunnel diodes are highly unstable and hard to control when driven from a D.C. source, as described by Esaki, "Physical Review," 1958, p. 603. It is less well-known that it can also be unstable without D.C. bias when driven with an A.C. signal and loaded with a tuned circuit as shown in FIG. 4.

Telemetry transmitter 80, utilizing a tunnel diode as the negative resistance diode 85, operates upon this principle in the following manner. When a signal of frequency F is first applied to the tunnel diode, the signal is rectified and a current through inductor 88 is built up. As this current reaches a value equal to the peak of the tunnel diode characteristic, the tunnel diode voltage will suddenly change from the low value at the peak (typically 65 mv.) to a point on the rising branch of the characteristic (typically 1 v.). If the applied voltage at frequency F is not too high, the tunnel diode will no longer rectify, so tuned circuit 86 will start an oscillation which a little later allows rectification to begin again and so excite the next cycle.

As before, the tunnel diode acts now both as a negative resistance required for oscillation, and as a switch that alternately connects and disconnects tuned circuit 86 from tuned circuit 81 at the frequency $f$.

Figure 5:
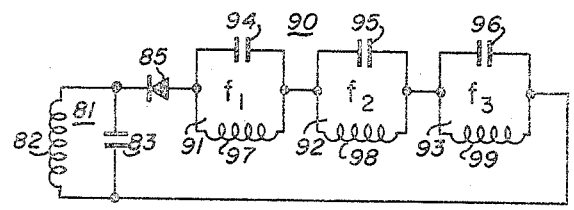
FIGURE 5 is a schematic circuit diagram of another embodiment of the telemetry transmitter of FIGURE 4 useful for monitoring a plurality of conditions.

Referring now to FIGURE 5, there is shown an alternate embodiment of the circuit of FIGURE 4, and the same reference characters have been utilized to designate like parts. There is shown a telemetry transmitter 90 which includes, in addition to tuned circuit 81 and a negative resistance diode 85, a plurality of tuned circuits 91, 92 and 93, tuned respectively to frequencies $f_1$, $f_2$ and $f_3$. Tuned circuits 91, 92 and 93, respectively, include a capacitor 94, 95 and 96 and an inductor 97, 98 and 99, at least one of which is condition responsive and changes its impedance in accordance with the value of the condition being monitored. For example, tuned circuit 91 may include a condition responsive capacitor 94 whose capacity is a function of temperature, tuned circuit 92 may include an inductor 98 whose inductance is a function of strain, and tuned circuit 93 may include a condition responsive element which is a function of pressure or humidity or the like. In this manner, and providing that the frequencies generated by tuned circuits 91, 92 and 93 are sufficiently different and do not overlap as the condition being monitored changes throughout its expected range, three conditions may be simultaneously monitored and the load reflected by coupling circuit 81 into the receiver coupling circuit includes three different switching rates (modulations), each of which has a frequency commensurate with a different condition being monitored.

Figure 6:
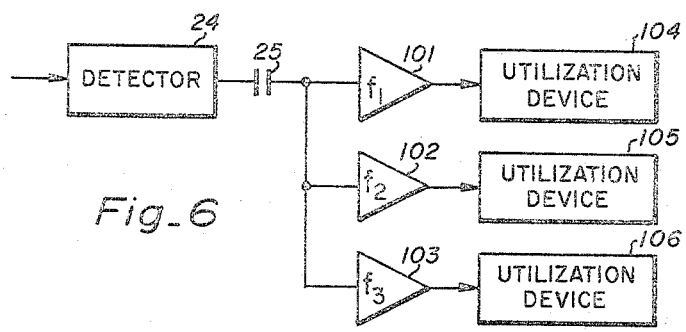
FIGURE 6 is a modification of the detector output portion of the telemetry receiver of FIGURE 1 for detecting a plurality of conditions.

Referring now to FIGURE 6, there is shown an output system for discriminating between the frequencies $f_1$, $f_2$ and $f_3$. As there shown, detector 4, which is identically connected as shown in FIGURE 1, has its output applied, through a suitable coupling capacitor 25, to three tuned amplifiers 101, 102 and 103 each of which is broadly but not overlappingly tuned to a different one of frequencies $f_1$, $f_2$ and $f_3$. The output of each of the tuned amplifiers is applied to a suitable utilization device, such as 104, 105 and 106, which, individually, may be similar to utilization device 28 of FIGURE 1. In this manner, each modulating frequency may be separately determined from which the condition being monitored can be derived.

Figure 7:
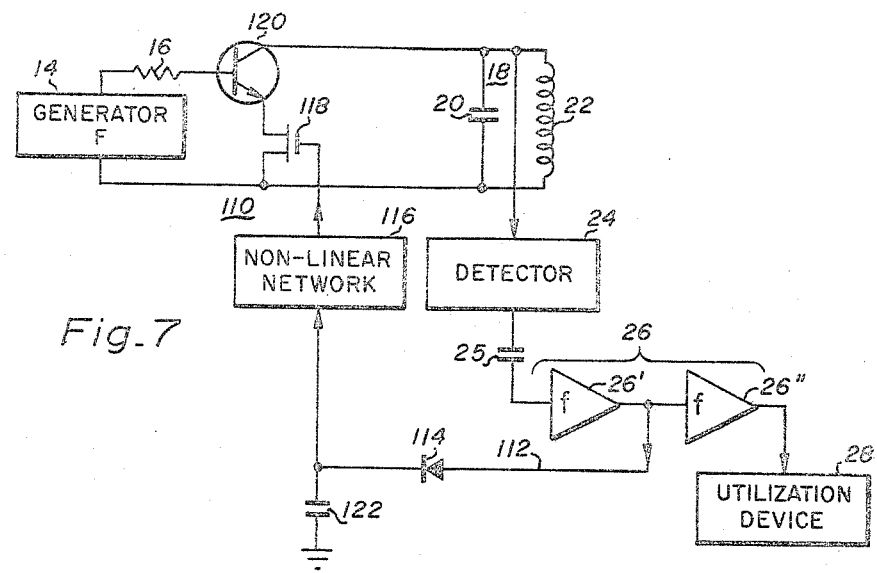
FIGURE 7 is an alternate embodiment of the telemetry receiver of FIGURE 1 utilizing AGC network.

Referring now to FIGURE 7, there is shown an alternate embodiment of the telemetry receiver of this invention which is particularly useful for applications where the proximity or degree of coupling between receiver coupling circuit 18 and transmitter coupling circuit 30 is subject to variations, a situation which is encountered where a single telemetry receiver is utilized to monitor the output of a plurality of telemetry transmitters or where the telemetry transmitter is in motion. An example of the latter situation is encountered in the hot box detection of moving railroad stock where the telemetry receiver is fixed with respect to the tracks, and the hot box carries the telemetry transmitter. In such applications, it becomes necessary to drive the receiver coupling circuit at a very high signal level when the same is some distance from the telemetry transmitter coupling circuit in order to induce a sufficient signal to power the telemetry transmitter. If the transmitter and receiver coupling circuits are brought into closer proximity to one another, the coupled signal may grow rapidly with the diminishing distance therebetween and may soon reach a point where the coupled signal is strong enough to disturb the normal operation of the transmitter.

To prevent overdriving the telemetry transmitter at close coupling, telemetry receiver 110 is equipped with an AGC loop which comprises a feedback path 112. The output from amplifier 26, or from an intermediate point in amplifier 26 such as 26′, is proportional to the degree of modulation of the RF signal in coupling circuit 18 which, in turn, is a function of the proximity between coupling circuits of telemetry transmitter 110 and the telemetry receiver. Since the level of the signal at frequency F coupled into the transmitter tuned circuit is also a function of the coupling between the circuits 18 and 30, the output from amplifier 26′ can be used as an indication of the closeness of coupling circuits.

As shown in FIG. 7, this signal is rectified by a detector 114 and used to control the gain of transistor amplifier 120 which drives tuned circuit 18. A unijunction transistor 118 is used as an un-bypassed emitter resistance for transistor 120 whose gain depends on the resistance of transistor 118 and therefore on the bias applied to the gate electrode of transistor 118.

To prevent the AGC loop from keeping the output voltage from amplifier 26′ constant which generally does not result in maintaining the voltage induced into coupling circuit 30 in the transmitter constant, a compensating or non-linear network 116 may be connected to operate on the rectified feedback signal. Non-linear circuit 116 is constructed in such a manner that the AGC loop maintains the voltage induced into circuit 30 nearly constant in spite of changes in coupling.

There has been described hereinabove a telemetry system which has a wireless and radioless communication link in which the telemetry receiver and transmitter are either inductively or capacitively coupled to one another. The telemetry transmitter is constructed to monitor one or more conditions, and translate the same into a transmitter signal whose frequency is commensurate with the monitored condition. This information is transmitted to the telemetry receiver by the process of modulated reaction whereby an impedance change in the transmitter coupling circuit is reflected into the receiver coupling circuit, and in which the rate of the impedance change is a modulation which is indicative of the condition being monitored.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. A wireless and radioless condition monitoring telemetry system comprising, in combination:
   a telemetry transmitter including, a substantially non-radiative transmitter coupling circuit tuned to a receiver frequency, and condition responsive means coupled to said transmitter coupling circuit, said condition responsive means being responsive to the condition being monitored and operative to vary the impedance of said transmitter coupling circuit between a first and a second state at a transmitter frequency which is commensurate with the condition being monitored; and
   a telemetry receiver including, a substantially non-radiative receiver coupling circuit tuned to said receiver frequency and adapted to be disposed in coupling proximity with said transmitter coupling circuit for interaction therewith, means for exciting oscillations in said receiver coupling circuit at said receiver frequency, detection means responsive to the characteristic of the oscillations excited in said receiver coupling circuit which varies as a result of varying the impedance of said transmitter coupling circuit when said coupling circuits are in coupling proximity and operative to provide a detected signal commensurate with said transmitter frequency, and detected signal utilization means for determining said transmitter frequency and thereby the condition being monitored.

2. A condition monitoring telemetry system in accordance with claim 1 in which said telemetry receiver further includes means responsive to the amplitude of said detected signal and operative to control the means for exciting oscillations in said receiver coupling circuit to maintain the amplitude of the receiver signal induced into said transmitter coupling circuit at a substantially constant level.

3. A condition monitoring telemetry system in accordance with claim 1 in which said condition responsive means comprises impedance circuit means for changing the impedance of said transmitter coupling circuit, and condition responsive switching means for alternately connecting and disconnecting said impedance circuit means into and out of said transmitter coupling circuit.

4. A condition monitoring telemetry system in accordance with claim 1 in which said condition responsive means comprises at least one frequency determining circuit having a condition responsive element therein, and a negative resistance diode means having one of its electrodes coupled to said transmitter coupling circuit and its other electrode coupled to said frequency determining circuit, said frequency determining circuit being tuned to said transmitter frequency which is selected to be very much smaller than said receiver frequency.

5. A condition monitoring telemetry system in accordance with claim 1 in which said condition responsive means comprises: negative resistance diode means having one of its electrodes connected to one side of said transmitter coupling circuit, and a frequency determining circuit including at least one condition responsive impedance, said frequency determining circuit being connected between the other electrode of said diode and the other side of said transmitter coupling circuit.

6. A condition monitoring telemetry system in accordance with claim 1 in which said condition responsive means includes, oscillator means having a condition responsive element for generating a transmitter signal whose frequency is commensurate with the condition being monitored, and impedance means responsive to said transmitter signal and operative to change its impedance between two states at the frequency of said transmitter signal.

7. A condition monitoring telemetry system in accordance with claim 1 in which the sole electrical power for operating said condition responsive means is derived from the power coupled into said transmitter coupling circuit by said receiver coupling circuit.

8. A condition monitoring telemetry system in accordance with claim 1 in which said condition responsive means comprises, a free running multivibrator including at least one condition responsive impedance in at least one of its RC timing circuits, and impedance means responsive to the state of said multivibrator and operative to change its impedance in accordance with the state of said multivibrator, said impedance means being coupled to said transmitter coupling circuit to change the impedance thereof between said first and second state.

9. A condition monitoring telemetry system of the type in which an interrogating receiver interrogates a responding transmitter when the nonradiative coupling circuit of the receiver, which is turned to and excited by a receiver signal, is brought into coupling proximity with the nonradiative coupling circuit of the transmitter and in which, in response to such interrogation, the transmitter provides a reaction in the receiver coupling circuit in accordance with a predetermined program, the improvement in the transmitter comprising:

a condition responsive means coupled to the transmitter coupling circuit to change the transmitter coupling circuit impedance between a first state and a second state at a transmitter frequency which is commensurate with the condition being monitored.

10. A condition monitoring telemetry system in accordance with claim 9 in which said condition responsive means comprises impedance circuit means for changing the impedance of said transmitter coupling circuit, and condition responsive switching means for alternately connecting and disconnecting said impedance circuit means into and out of said transmitter coupling circuit.

11. A condition monitoring telemetry system in accordance with claim 9 in which said condition responsive means comprises at least one transmitter frequency determining circuit having a condition responsive element therein, and a negative resistance diode means connected tween the other electrode of said diode and the other side quency determining circuit.

12. A condition monitoring telemetry system in accordance with claim 9 in which said condition responsive means includes, negative resistance diode means having one of its electrodes connected to one side of said transmitter coupling circuit, and a frequency determining circuit having at least one condition responsive impedance, said frequency determining circuit being connected between the other electrode of said diode and the other side of said transmitter coupling circuit.

13. A condition monitoring telemetry system in accordance with claim 9 in which said condition responsive means comprises, a free running multivibrator including at least one condition responsive impedance in at least one of its RC timing circuits, and impedance means responsive to the state of said multivibrator and operative to change its impedance in accordance with the state of said multivibrator, said impedance means being coupled to said transmitter coupling circuit to change the impedance thereof between said first and second state.

14. A condition monitoring telemetry transmitter including a transmitter coupling circuit for cooperation with a telemetry receiver having a substantially nonradiative coupling circuit turned to and excited by a receiver frequency which reacts when brought into coupling proximity with the transmitter coupling circuit reflecting changes in the impedance of the transmitter coupling circuit, said telemetry transmitter comprising:

a substantially nonradiative coupling circuit tuned to the receiver frequency for coupling interaction with the receiver coupling circuit; and condition responsive impedance means coupled to said receiver coupling circuit for changing the impedance of said coupling circuit between a first and a second state at a frequency which is a measure of the condition being monitored.

References Cited

UNITED STATES PATENTS

| 2,818,732 | 1/1958 | Bennett | 343—6.5 |
| 3,022,492 | 2/1962 | Kleist et al. | 340—152 |
| 3,125,753 | 3/1964 | Jones | 340—152 |
| 3,158,027 | 11/1964 | Kibler | 340—177 |

OTHER REFERENCES

Straube, A Voltage Variable Capacitor, Electronic Industries, July 1958, pp. 77–80.

RODNEY D. BENNETT, JR., *Primary Examiner.*

BRIAN L. RIBANDO, *Assistant Examiner.*

U.S. Cl. X.R.

340—258; 179—82